US00RE48740E

(19) United States
(12) Reissued Patent
Thompson

(10) Patent Number: US RE48,740 E
(45) Date of Reissued Patent: Sep. 14, 2021

(54) ADAPTIVE PROCESSING OF VIDEO STREAMS WITH REDUCED COLOR RESOLUTION

(71) Applicant: Lattice Semiconductor Corporation, Hillsboro, OR (US)

(72) Inventor: Laurence Alan Thompson, Morgan Hill, CA (US)

(73) Assignee: LATTICE SEMICONDUCTOR CORPORATION, Hillsboro, OR (US)

(21) Appl. No.: 16/460,966

(22) Filed: Jul. 2, 2019

Related U.S. Patent Documents

Reissue of:

(64) Patent No.: 9,699,469
Issued: Jul. 4, 2017
Appl. No.: 14/626,028
Filed: Feb. 19, 2015

U.S. Applications:

(63) Continuation of application No. 16/459,538, filed on Jul. 1, 2019, which is an application for the reissue of Pat. No. 9,699,469.

(Continued)

(51) Int. Cl.
*H04N 19/00* (2014.01)
*H04N 19/186* (2014.01)

(Continued)

(52) U.S. Cl.
CPC ..... *H04N 19/186* (2014.11); *H04N 19/196* (2014.11); *H04N 19/85* (2014.11); *H04N 19/136* (2014.11); *H04N 19/172* (2014.11)

(58) Field of Classification Search
CPC .... H04N 19/186; H04N 19/196; H04N 19/85; H04N 19/172; H04N 19/136
See application file for complete search history.

(56) References Cited

U.S. PATENT DOCUMENTS 5,440,345 A * 8/1995 Shimoda ..... H04N 9/8047 348/467
5,557,479 A * 9/1996 Yanagihara ..... H04N 9/7973 360/32

(Continued)

FOREIGN PATENT DOCUMENTS

CN 101589625 11/2009
CN 101589625 A 11/2009

(Continued)

OTHER PUBLICATIONS

Chinese First Office Action, Chinese Application No. 201580009702.9, dated Mar. 2, 2017, 9 pages (with concise explanation of relevance).

(Continued)

*Primary Examiner* — Colin M LaRose
(74) *Attorney, Agent, or Firm* — Haynes and Boone, LLP

(57) ABSTRACT

A solution for adaptively processing a digital image with reduced color resolution is described herein. A source device pre-processes a video frame with reduce color resolution by remapping luma components and chroma components of the video frame, and encodes the pre-processed video frame. The source device remaps a half of luma components on a scan line of the video frame onto a data channel of a source line to an encoder and remaps the other half of the luma components on the scan line to another data channel of the source line. The source device remaps the corresponding chroma components onto a third data channel of a source line. By using a data channel conventionally configured to transmit chroma components, the solution enables a video (Continued)

codec to adaptively encode a digital image with reduced color resolution without converting the digital image to full color resolution before the encoding.

20 Claims, 8 Drawing Sheets

Related U.S. Application Data

(60) Provisional application No. 61/943,267, filed on Feb. 21, 2014.

(51) Int. Cl.

| | |
|---|---|
| ***H04N 19/196*** | (2014.01) |
| ***H04N 19/85*** | (2014.01) |
| *H04N 19/136* | (2014.01) |
| *H04N 19/172* | (2014.01) |

(56) References Cited

U.S. PATENT DOCUMENTS

| | | | | |
|---|---|---|---|---|
| 6,100,941 | A * | 8/2000 | Dimitrova | G06F 17/30814 348/700 |
| 6,427,025 | B1 * | 7/2002 | Shimomura | G06T 9/00 375/E7.077 |
| 6,519,287 | B1 * | 2/2003 | Hawkins | H04N 19/51 375/240.16 |
| 6,539,120 | B1 * | 3/2003 | Sita | G06T 1/60 348/E5.108 |
| 6,961,063 | B1 * | 11/2005 | Kuriakin | G09G 5/42 345/506 |
| 7,643,675 | B2 * | 1/2010 | Evans | G09G 5/363 382/162 |
| 8,363,969 | B1 * | 1/2013 | Wang | H04N 19/30 382/251 |
| 8,428,349 | B2 * | 4/2013 | MacInnis | H04N 19/16 382/166 |
| 8,817,179 | B2 * | 8/2014 | Zhu | H04N 19/88 348/453 |
| 8,984,181 | B2 * | 3/2015 | Minemura | H04N 21/4755 710/33 |
| 9,167,272 | B2 * | 10/2015 | Lu | H04N 19/88 |
| 9,635,303 | B2 * | 4/2017 | Suzuki | H04N 5/765 |
| 9,979,960 | B2 * | 5/2018 | Zhu | H04N 19/70 |
| 2004/0113913 | A1 * | 6/2004 | Gu | G09G 5/395 345/549 |
| 2005/0013497 | A1 * | 1/2005 | Hsu | H04N 19/52 382/239 |
| 2006/0132660 | A1 | 6/2006 | Kurumisawa | |
| 2006/0133683 | A1 * | 6/2006 | Srinivasan | G06F 17/147 382/250 |
| 2007/0036443 | A1 * | 2/2007 | Srinivasan | H03M 7/40 382/232 |
| 2007/0046684 | A1 * | 3/2007 | Jeffrey | G09G 5/39 345/572 |
| 2008/0159641 | A1 * | 7/2008 | Moriya | H04N 19/139 382/239 |
| 2010/0158400 | A1 * | 6/2010 | Lu | H04N 19/176 382/238 |
| 2010/0183071 | A1 | 7/2010 | Segall et al. | |
| 2011/0103472 | A1 * | 5/2011 | Lefebvre | H04N 21/43615 375/240.12 |
| 2013/0010187 | A1 * | 1/2013 | Yamashita | H04N 21/23602 348/441 |
| 2013/0301698 | A1 | 11/2013 | Macinnis | |
| 2013/0322745 | A1 * | 12/2013 | Lim | H04N 9/73 382/162 |

FOREIGN PATENT DOCUMENTS

| | | |
|---|---|---|
| CN | 101594536 | 12/2009 |
| CN | 101594536 A | 12/2009 |
| EP | 1154378 | 11/2001 |
| EP | 1154378 A2 | 11/2001 |

OTHER PUBLICATIONS

PCT International Search Report and Written Opinion, PCT Application No. PCT/US2015/016640, dated May 22, 2015, 14 pages.

PCT International Search Report and Written Opinion, PCT Application No. PCT/US2015/016640, May 22, 2015, 14 pages.

Shah, K., "Time Optimization of HEVC Encoder X86 Processors Using SIMD," Multimedia Processing EE5459, Department of Electrical Engineering, University of Texas, Arlington, 2013, pp. 1-18.

Syed, Y.F. et al., "Keeping Video Quality Pristine Throughout the Production Process; Introducing 10-bit 4:2:2 AVC/H.264 Encoding," SMPTE Conference Process, Oct. 2009, pp. 1-14.

Chinese First Office Action, Chinese Application No. 201580009702.9, Mar. 2, 2017, 9 pages (with concise explanation of relevance).

* cited by examiner

ADAPTIVE PROCESSING OF VIDEO STREAMS WITH REDUCED COLOR RESOLUTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for U.S. Pat. No. 9,699,469. The reissue applications are U.S. patent application Ser. No. 16/459,538, filed Jul. 1, 2019, and the present application, which is a continuation reissue of U.S. patent application Ser. No. 16/459,538.*

CROSS REFERENCE TO RELATED APPLICATIONS

This application *is a continuation reissue of U.S. patent application Ser. No. 16/459,538, filed on Jul. 1, 2019, which is an application for reissue of U.S. Pat. No. 9,699,469, which in turn* claims the benefit of U.S. Provisional Application No. 61/943,267, filed Feb. 21, 2014, *each of* which is incorporated by reference in its entirety.

FIELD

Embodiments of the invention generally relate to digital media content processing and, more particularly, to adaptive processing of video streams with reduced color resolution.

BACKGROUND

The transmittal of video data over a video channel in modern digital audio/video interface systems is generally subject to some storage and transmission limitations, e.g., network bandwidth. New television and video formats are being developed to provide high resolution video content. However, such development presents a new challenge to audio/video interface standards because support for high data rates is required. Video compression tools (also referred to as "video codecs"), e.g., encoders and decoders, are often used in audio/video interface standards to reduce data rate transmitted over an audio/video channel by compressing the signals of the video data.

Another data reduction technique is to reduce resolution for chroma (or color) information than for luma (or brightness) information of signals of the video data through chroma subsampling. Examples of chroma subsampling include 4:2:2 and 4:2:0 in YCbCr color space. Chroma subsampling uses fewer bits for encoding the signals of video data than for signals of video data with full chroma resolution (e.g., 4:4:4 sampling ratio), which makes the transmittal of video data more efficient while maintaining acceptable visual quality. However, encoding processes of existing video compression codecs often only accept signals of video data at full resolution (e.g., 4:4:4 sampling ratio); in other words, if a video signal uses other sampling ratios, e.g., 4:2:2 or 4:2:0, it must be converted to 4:4:4 before encoding, which may add computational complexity and performance delay.

SUMMARY

A solution for adaptively processing a digital image with reduced color resolution, e.g., 4:2:0 subsampling ratio in YCbCr color space, in a video interface environment is described herein. By using a data channel conventionally configured to transmit chroma pixels, the solution enables a video codec to adaptively encode a digital image with reduced color resolution without converting the digital image to full color resolution before the encoding.

A source device of the solution pre-processes a video frame with reduced color resolution by remapping luma components and chroma components of the video frame, and encodes the pre-processed video frame. In one embodiment, the source device has a pre-process module and an encoder. The pre-process module partitions the video frame into multiple subpictures and remaps the luma components and chroma components within each subpicture of the video frame. For example, the pre-process module remaps luma components on a scan line of a subpicture of the video frame onto a data channel of an encoder and remaps the other half of the luma components on the scan line to another data channel of the encoder. The source device remaps the corresponding chroma components onto a third data channel of the encoder.

A sink device of the solution post-processes an encoded video frame with reduced color resolution. In one embodiment, the sink device has a decoder and a post-process module. The post-process module receives the decoded video frame and remaps the luma components and chroma components of the decoded video frame according a data structure describing the remapping. Based on the remapping, the post-process reconstructs a video frame properly formatted in a reduced color resolution.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A solution is provided that allows a video compression codec that accepts only videos with full chroma resolution, e.g., 4:4:4 sampling ratio, to process videos with reduced color resolution, e.g., 4:2:0 sampling ratio. Embodiments of the invention pre-process a 4:2:0 subsampled video frame by remapping luma and chroma components of pixels of the video frame onto three input channels of a compression encoder while maintaining the spatial relationship the luma and chroma components before remapping within each portion of the video frame.

As used herein, "network" or "communication network" mean an interconnection network to deliver digital media content (including music, audio/video, gaming, photos/images, and others) between devices using any number of technologies, such as Serial ATA (SATA), Frame Information Structure (FIS), etc. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Such devices are referred to herein as "source devices" or "transmitting devices". Other devices may receive, display, use, or store media content, such as a digital television, home theater system, audio system, gaming system, video and audio storage server, and the like. Such devices are referred to herein as "sink devices" or "receiving devices".

As used herein, a "video interface environment" refers to an environment including a source device and a sink device coupled by a video channel. One example of a video interface environment is a High-Definition Multimedia Interface (HDMI environment, in which a source device (such as a DVD player) is configured to provide media content encoded according to HDMI protocol over an HDMI channel or a MHL3 channel to a sink device (such as television or other display).

It should be noted that certain devices may perform multiple media functions, such as a cable set-top box that can serve as a receiver (receiving information from a cable head-end) as well as a transmitter (transmitting information to a TV) and vice versa. In some embodiments, the source and sink devices may be co-located on a single local area network. In other embodiments, the devices may span multiple network segments, such as through tunneling between local area networks. It should be noted that although pre-processing a video frame with reduced color resolution and post-processing the video frame is described herein in the context of a video interface environment, the pre-processing and post-processing techniques described herein are applicable to other types of data transfer between a source device and a sink device, such as network data in a networking environment, and the like.

Figure 1:
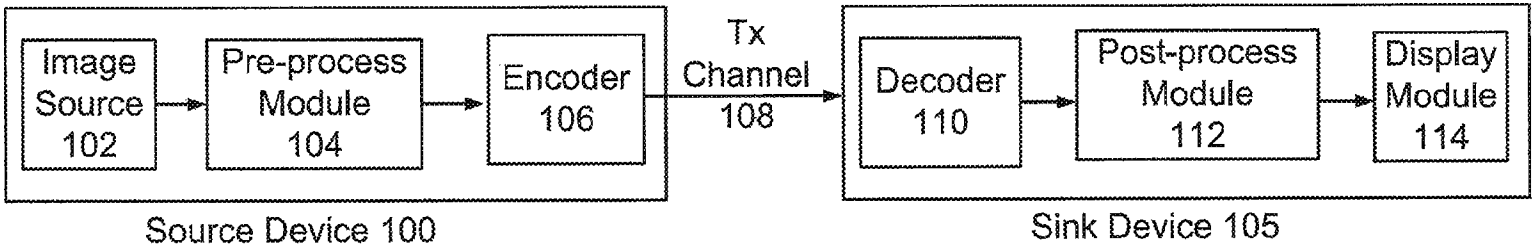
FIG. 1 is a block diagram illustrating a video interface environment according to one embodiment.

FIG. 1 is a block diagram illustrating a video interface environment according to one embodiment. The environment of FIG. 1 includes a source device 100 coupled to a sink device 105 by a data transmission channel 108. The source device 100 includes an image source 102, a pre-process module 104, and an encoder 106. The sink device 105 includes a video decoder 110, a post-process module 112, and a display module 114. Other embodiments of the environment of FIG. 1 can include different and/or additional components than those illustrated herein. For example, the data transmission channel 108 can be any suitable type of video or communications channel, such as an HDMI channel, an MHL3 channel or another serial-type channel.

The image source 102 can be a non-transitory computer-readable storage medium, such as a memory, configured to store one or more videos and/or digital images for transmitting to the sink device 105. The image source 102 can also be configured to access videos stored external to the source device 100, for example, from an external video server communicatively coupled to the source device 100 by the Internet or some other type of network. In this disclosure, "digital content" or "digital media content" generally refers to any machine-readable and machine-storable work. Digital content can include, for example, video, audio or a combination of video and audio. Alternatively, digital content may be a still image, such as a JPEG or GIF file or a text file. For purposes of simplicity and the description of one embodiment, the digital content from the image source 102 will be referred to as a "video," or "video files," but no limitation on the type of digital content that can be processed are indented by this terminology. Thus, the operations described herein for pre-processing and post-processing pixels of a video frame can be applied to any type of digital content, including videos and other suitable types of digital content such as audio files (e.g. music, podcasts, audio books, and the like).

The pre-process module 104 receives an input video frame with full color resolution (e.g., 4:4:4 sampling ratio) or reduced color resolution (e.g., 4:2:0 sampling ratio) in YCbCr color space from the image source 102. Responsive to the video frame with reduced color resolution, the pre-process module 104 remaps the luma and chroma pixels of the video frame onto the three input channels of the encoder 106 by reordering the luma and chroma pixels of the video frame according to a data structure describing the reordering. The pre-processed video frame is encoded by the encoder 106, which may only accept video frames with full resolution of 4:4:4 subsampling ratio. The pre-process module 104 is further described below with respect to FIGS. 2, 4A, 4B, 5 and 6.

The encoder 106 is configured to encode video frames pre-processed by the pre-process module 104. In one embodiment, the encoder 106 only accepts video frames with full resolution of 4:4:4 subsampling ratio. The encoder 106 may have a memory or other storage medium configured to buffer partial or entire video frame encoded by the encoder 106. The encoder 106 can implement any suitable type of encoding, for instance, encoding intended to reduce the quantity of video frame being transmitted (such as the Video Electronics Standards Association (VESA) Display Stream Compression (DSC) and the like), encoding intended to secure the video data from illicit copying or interception (such as High-Definition Content Protection (HDCP) encoding and the like), or any combination of the two. Embodiments of the encoder 106 may use any video compression schemes known to those of ordinary skills in the art, including, for example, discrete cosine transform (DCT), wavelet transform, quantization and entropy encoding. The encoder 106 is configured to transmit the encoded video data according to an audio/video interface protocol, e.g., an HDMI protocol, over the transmission channel 108 to the decoder 110 of the sink device 105.

The decoder 110 is configured to decode an encoded video frame received from the encoder 106. In one embodiment, the decoder 110 has a memory or other storage medium configured to buffer partial or entire video frame decoded by the decoder 110. The decoding process performed by the decoder 110 is an inversion of each stage of the encoding process performed by the encoder 106 (except the quantization stage in lossy compression). For example, the decoder 110 performs inverse DCT/wavelet transform, inverse quantization and entropy decoding to an encoded frame to reconstruct the original input video frame. For another example, the decoder 110 performs decoding process according to the VESA/DSC coding standard responsive to the encoder 106 encoding the video frame according to the VESA/DSC coding standard.

The post-process module 112 receives a decoded video frame from the decoder 110 and determines whether to reorder pixels of the decoded video frame. Responsive to a decoded video frame with reduced color resolution, the post-process module 112 performs the actions same as the pre-process module 104, but in a reverse order. For example, the post-process module 112 reorders the pixels of the video frame according to a data structure describing the reordering prior to the transmission of the pixels of the video frame to the display module 114.

The display module 114 is configured to display video frames processed by the post-process module 112. Alternatively, the display module 114 can store the video frames received from the post-process module 112, or can output the video frames to (for example) an external display, storage, or device (such as a mobile device).

Figure 2:
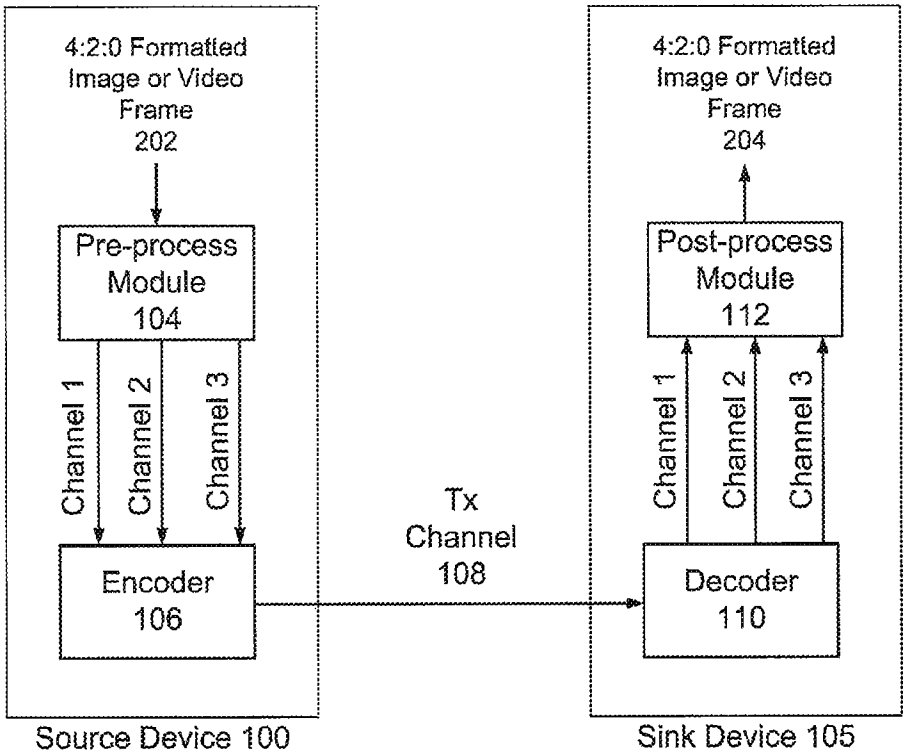
FIG. 2 is a block diagram illustrating a video interface environment with input data being formatted according to 4:2:0 sampling ratio according to one embodiment.

FIG. 2 is a block diagram illustrating a video interface environment with input data being formatted according to 4:2:0 sampling ratio according to one embodiment. The environment of FIG. 2 includes a source device 100 coupled to a sink device 105 by a data transmission channel 108. The source device 100 includes a pre-process module 104 and an encoder 106. The sink device 105 includes a video decoder 110 and a post-process module 112. The source device 100 receives a 4:2:0 formatted image/video frame 202, e.g., a video frame of a video stream with a reduced color resolution of 4:2:0 subsampling ratio, preprocesses the video frame and encodes the video frame. The encoded video frame is transmitted over the transmission channel 108 to the sink device 105. The sink device 105 decodes the received video frame and post-processes the decoded frame to reconstruct a 4:2:0 formatted video frame 204 for display.

The 4:2:0 formatted video frame 202 has multiple number of pixels, where the size of the frame is determined by its resolution. Each pixel of the video frame 202 consists of a luma signal and chroma signals. It is noted that the luma signal is perceptually more important from the chroma signal, which can be presented at lower resolution to achieve more efficient data reduction. In the embodiment illustrated in FIG. 2, the subsampling ratio between the luma signal and chroma signal of a pixel are stored in Y:Cb:Cr format over three data channels, Y, Cb and Cr, where Y represents the luma signal and Cb and Cr represent the chroma signal. The 4:2:0 subsampling ratio indicates that the chroma signal (represented by Cb and Cr) has a one-half horizontal resolution and a one-half vertical resolution as of the corresponding luma signal.

Figure 7:
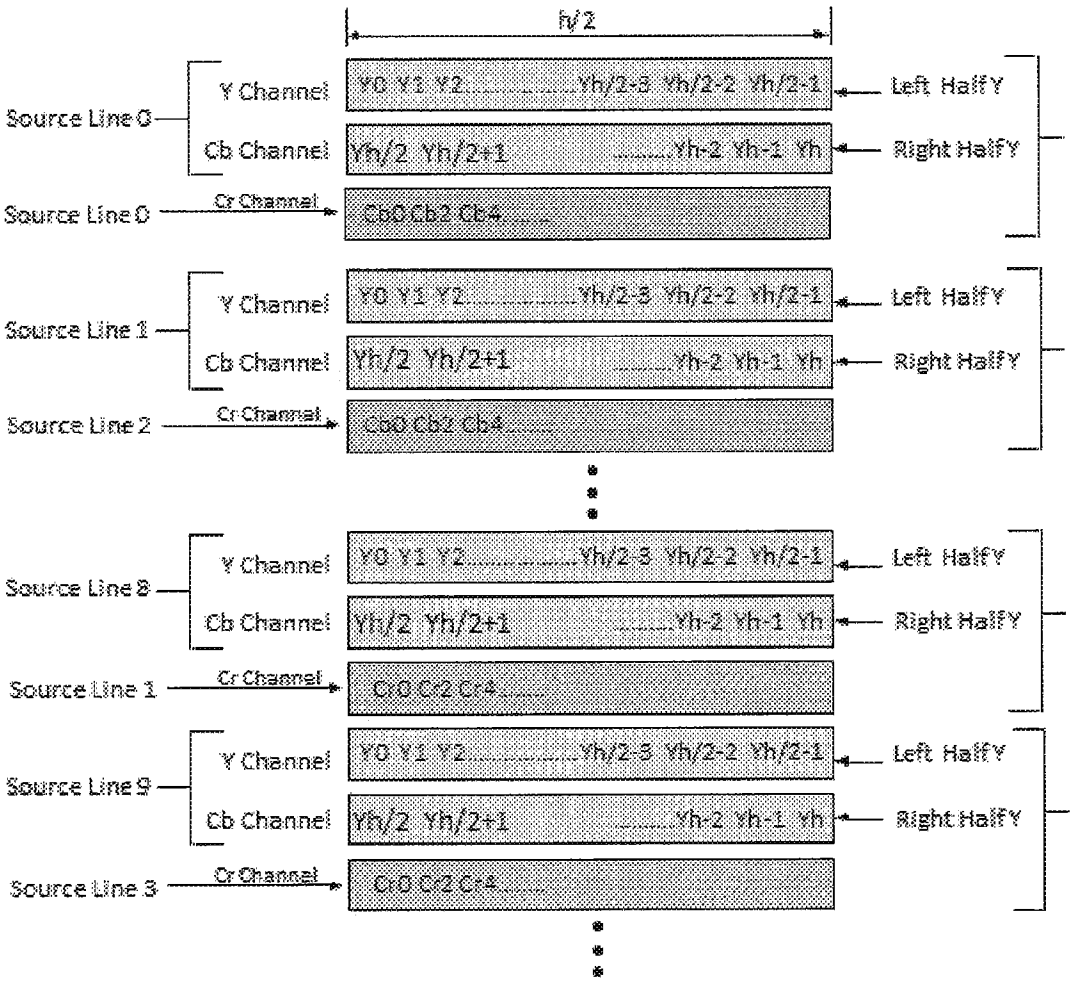
FIG. 7 shows an example of a data structure representing a video frame with pre-processed luma components and corresponding chroma components according to one embodiment.

The pre-process module 104 receives the 4:2:0 formatted video frame 202, separates the luma pixels from the chroma pixels and remaps the luma pixels and chroma pixels onto the three pixel data channels, i.e., Channel 1, Channel 2 and Channel 3. Any known color space transformation and separation of luma signal from chroma signal of pixels can be used by the pre-process module 104. A video compression codec of existing solutions normally accepts video data at 4:4:4 subsampling ratio in Y, Cb and Cr format, where the codec maps the luma pixels onto Y channel, chroma Cb pixels onto Cb channel and chroma Cr pixels onto Cr channel. To enable the encoder 106 to encode 4:2:0 formatted video frames, the pre-process module 104 remaps the luma pixels onto two data channels and chroma information (Cb and Cr) onto the third data channel and presents the reordered luma and chroma components of pixels in a specified order defined in a data structure representing the preprocessed video frame (as shown in FIG. 7 below).

The encoder 106 receives the video frame 202 preprocessed by the pre-process module 104, encodes the video frame 202 and transmits the encoded video frame over the transmission channel 108 to the sink device 105. The decoder 110 decodes the received video frame and sends the decoded video frame to the post-process module 112, which reconstructs a 4:2:0 formatted video frame 204 for display according to the reordering data structure received from the source device 100.

Figure 3:
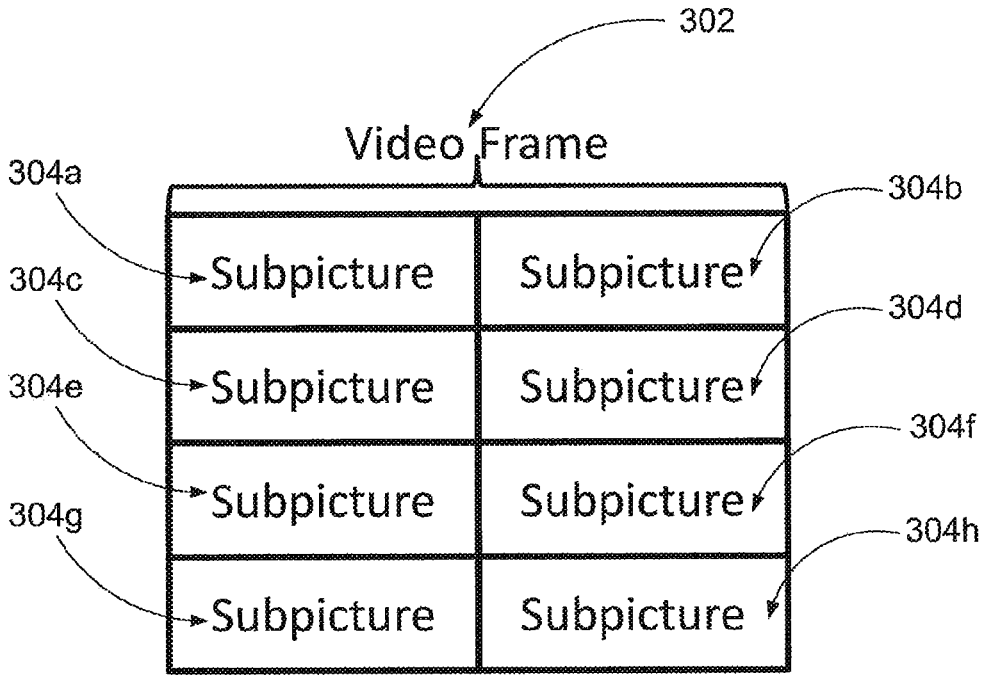
FIG. 3 is a block diagram illustrating a video frame partitioned into multiple subpictures according to one embodiment.

Pixels of a video frame on a scan line over the Y, Cb and Cr data channels have a relative position-based spatial relationship, which defines position of a pixel relative to other pixels of the video frame. To enable the encoding of a 4:2:0 formatted video frame, the pre-process module 104 reserves the original spatial relationship of the pixels after reordering the pixels. In one embodiment, the pre-process module 104 partitions a video frame into multiple subpictures, each of which is a portion of the video frame. FIG. 3 is a block diagram illustrating a video frame partitioned into multiple equal-sized subpictures according to one embodiment. The pre-process module 104 divides the video frame 302 into 4 subpictures, 304a-304h. Each subpicture has a rectangular shape with multiple pixels and each subpicture is independent from other subpictures for pre-processing and post-processing. The number of subpictures and size of a subpicture are configurable, in other words, different embodiments from the one illustrated in FIG. 3, may have different numbers of subpictures and sizes. To enable the encoding of a 4:2:0 formatted video frame, the pre-process module 104 remaps the 4:2:0 formatted pixels within each subpicture onto the three input channels to the encoder 106 and reserves the original spatial relationship of the pixels after reordering the pixels within each subpicture.

Figure 4A:
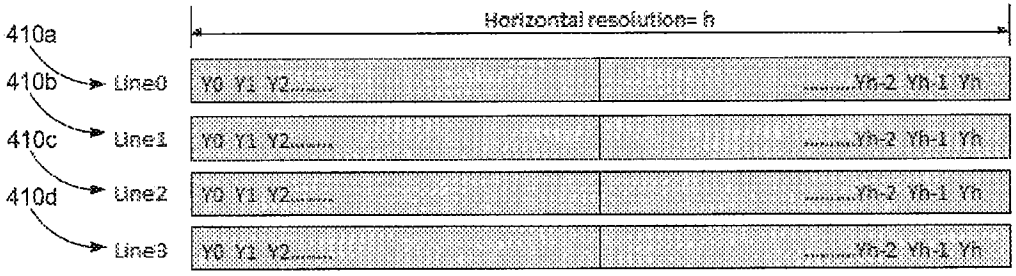
FIG. 4A illustrates luma components of a video frame before pre-processing.

FIG. 4A illustrates luma components of a video frame before pre-processing. In FIG. 4A, the horizontal resolution of luma components (i.e., Y components) is represented by parameter h in terms of number of components. FIG. 4A shows four lines of Y components, Line 0 (410a), Line 1 (410b), Line 2 (410c) and Line 3 (410d). The Y components on each line are positioned according to a scan line of a raster-scanned video frame, where the first component on the scan line is $Y_0$, and the last component on the scan line is $Y_{h-1}$.

Figure 4B:
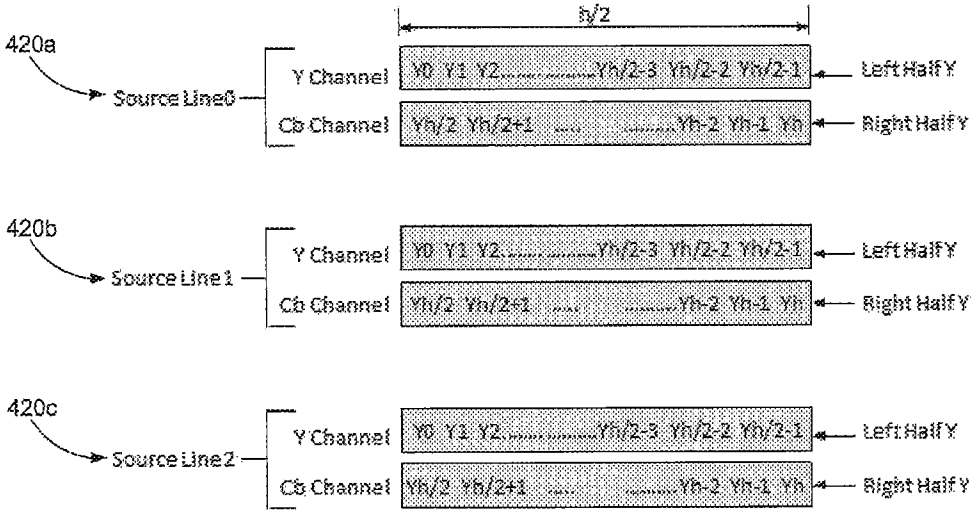
FIG. 4B illustrates luma components of the video frame illustrated in FIG. 4A after pre-processing according to one embodiment.

FIG. 4B illustrates luma components of the video frame illustrated in FIG. 4A after pre-processing according to one embodiment. The example in FIG. 4B shows three source lines, 420a, 420b and 420c, each of which is mapped to two encoder processing channels, Y channel and Cb channel, for inputting a scan line of Y components as shown in FIG. 4A to an encoder, e.g., the encoder 106 of FIG. 2. The pre-process module 104 maps a half of Y components on a scan line onto the Y processing input of an encoder, and half to a Cb channel input of an encoder. Each data channel has a half horizontal resolution as of the one shown in FIG. 4A. For example, assuming that source line 420a in FIG. 4B is for inputting the Y components on line 410a in FIG. 4A, the pre-process module 104 maps the left half Y components (i.e., components $Y_0$ to $Y_{h/2-1}$) on line 410a onto the Y channel of the encoder 420a and maps the right half Y components (i.e., components $Y_{2/h}$ to $Y_h$) on line 410a onto the Cb channel of the encoder 420a. The pre-process module 104 splits the Y components on a scan line into two streams without changing the relative spatial position of the components on each of the two streams within the boundaries of a subpicture. The original spatial relationship among the Y components on the scan line is maintained in each half of Y components after mapping. The pre-process module 104 similarly maps other lines of Y components, e.g., Y components on line 410b onto source line 420b and Y components on line 410c onto source line 420c.

To map the corresponding chroma components of a subpicture of a video frame onto a data channel, the pre-process module 104 uses a third data channel of a source line. Given that chroma components are represented by Cb and Cr components, in one embodiment, the pre-process module 104 maps the first type of chroma components, e.g., Cb components, onto a third data channel of a source line, and maps the second type of chroma components, e.g., Cr components, onto a third data channel of next source line.

Figure 6:
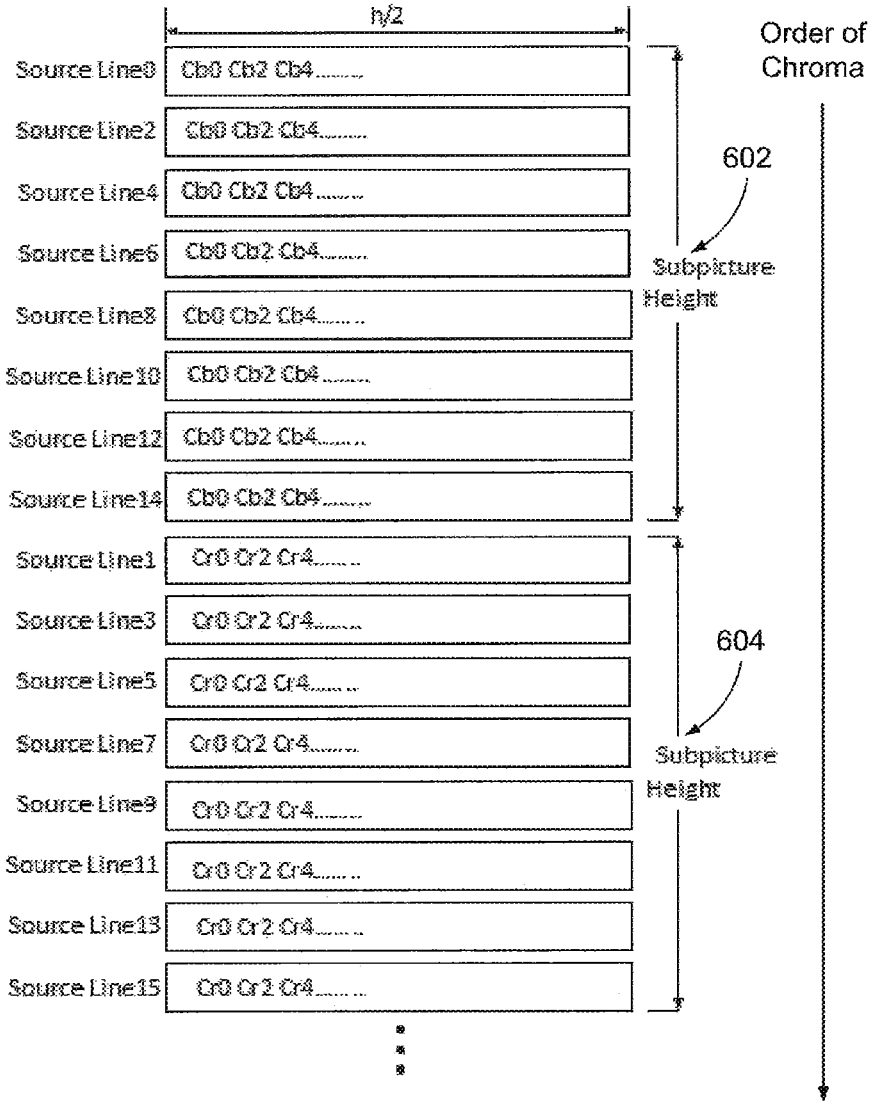
FIG. 6 shows an example of pre-processing corresponding chroma components of a video frame according one embodiment.

FIG. 6 shows an example of pre-processing corresponding chroma components of a video frame according one embodiment. The example illustrated in FIG. 6 shows two chroma subpictures of a video frame, subpicture 602 and subpicture 604. Each of the subpictures has a horizontal resolution and a vertical resolution, which is 8-pixel high (i.e., having 8 lines of chroma components). As noted above, the subpicture's height is typically programmable. The order of the chroma components being pre-processed of the two subpictures is from the first source line (source line 0) of subpicture 602 to the last source line (source line 15) of subpicture 604.

As shown in FIG. 6, the pre-process module 104 reorders the interleaved chroma components to 8 sequential lines for each type of chroma components. For example, all interleaved Cb components are reordered into one subpicture 602; all interleaved Cr components are similarly reordered into the other subpicture 604. As noted above, each subpicture is produced by the pre-process module 104 independently from the processing of other subpictures. The independence enables the reservation of the spatial relationship of chroma components within a subpicture because all lines of chroma components within a subpicture are the same chroma component, e.g., all Cb components in subpicture 602 and all Cr components in subpicture 604.

FIG. 7 shows an example of pre-processed luma components and corresponding chroma components of pixels of a video frame according to one embodiment. In the example of FIG. 7, the luma components represented by Y components are pre-processed according to one embodiment illustrated in FIG. 4B; the chroma components represented by Cb and Cr components are pre-processed according to one embodiment illustrated in FIG. 6. Similar to the subpictures in FIG. 6, the height of the subpictures in FIG. 7 is 8. The pre-process module 104 constructs the first 2 subpictures for channels 1, 2, and 3 of the encoder from the first 16 lines of the input video frame. For the first subpicture, data for channel 1 (i.e., the Y channel) comes from the left half of the input lines 0 through 7, and data for channel 2 (i.e., Cb channel) comes from the right half of input lines 0 through 7. Data for channel 3 (i.e., Cr channel) comes from the first 8 even numbered chroma lines of the input frame, which are all Cb components. For the second subpicture, data for channel 1 comes from the left half of the inputs lines 8 through 15, and data for channel 2 comes from the right half on input lines 8 through 15. Data for channel 3 comes from the first odd-numbered chroma lines of the input frame, which are all Cr components. The post-process module 112 performs the actions described here same as the pre-process module 104, but in a reverse order.

The example in FIG. 7 has three data input units. Each data input unit has three data channels, Y channel, Cb channel and Cr channel, to input the components reordered by the pre-process module 104 to an encoder, e.g., the encoder 106 of FIG. 2. The Cb channel conventionally designed to input Cb chroma components is used by the pre-process module 104 to input a second half of Y components on a scan line, e.g., the Cb channel of source line 0. The pre-process module 104 remaps the corresponding chroma components onto a third data channel of a source line, e.g., Cr channel of source line 0 and Cr channel of source line 2. The pre-process module 104 further reorders the same type of chroma pixels across two subpictures, e.g., all Cb components into one subpicture and all Cr components in the other subpicture.

In one embodiment, the pre-process module 104 generates a data structure to record the reordering of the luma and chroma components of pixels of a 4:2:0 formatted video frame. The data structure for the video frame may include mapping information of a scan line of luma components onto its corresponding source line for luma components, e.g., scanline (0, $Y_{left\text{-}half}$) onto sourceline (0, Cb). Similarly, the data structure for the video frame may also include mapping information of a scan line of chroma components onto its corresponding source line for chroma pixels and the type of the chroma component (e.g., Cb pixel or Cr component). Responsive to the video frame being partitioned into subpictures and the mapping being performed on subpictures, the data structure records the reordering information for each subpicture. The data structure recording the mapping may be transmitted together with the encoded video frame or separately by the encoder to the sink device 105.

Figure 8:
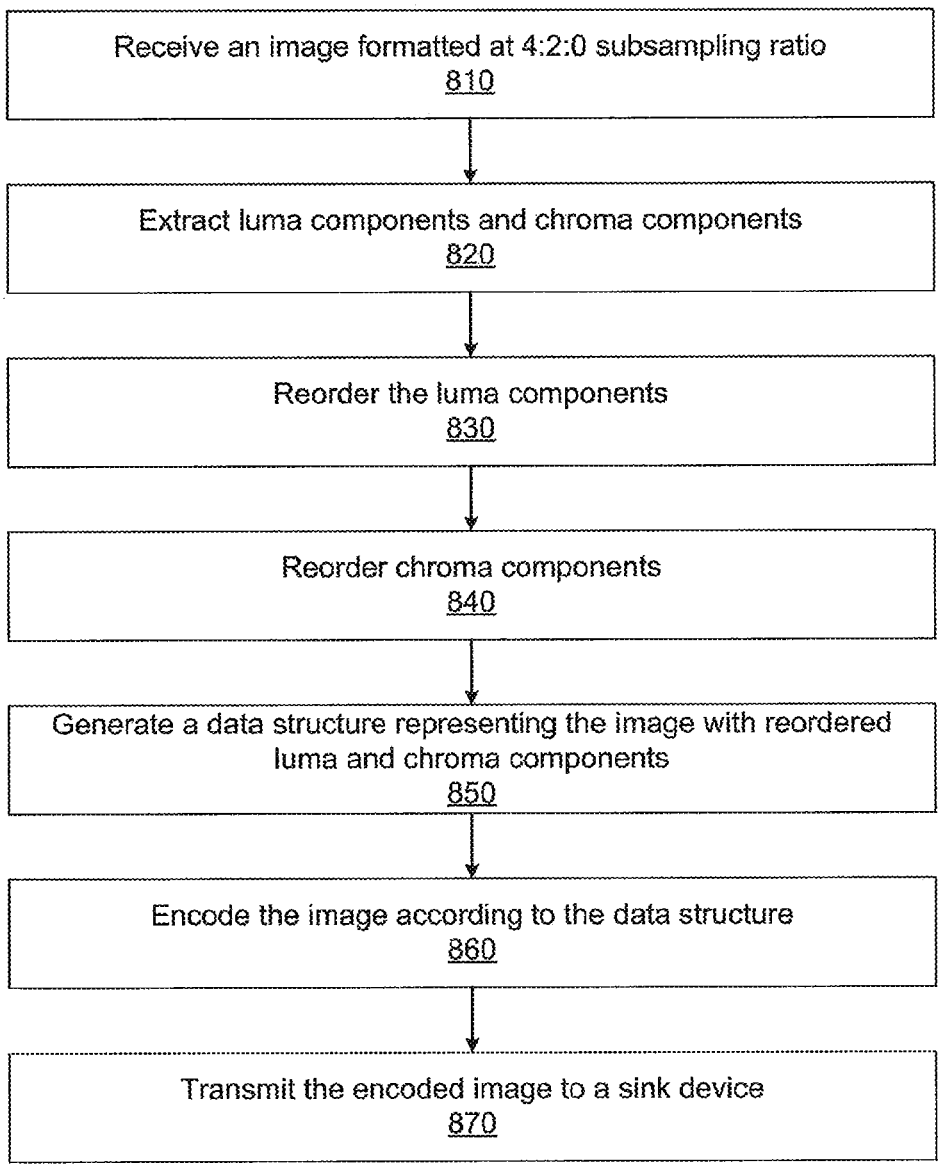
FIG. 8 is a flow chart illustrating a process for pre-processing luma and chroma components of pixels of a video frame at a source device according to one embodiment.

FIG. 8 is a flow chart illustrating a process for pre-processing luma and chroma components of pixels of a video frame at a source device according to one embodiment. Initially, a pre-process module of a source device, e.g., the pre-process module 104 of the source device 100 in FIG. 2, receives 810 an image, e.g., a video frame formatted at 4:2:0 subsampling ratio, and extracts 820 the luma signal and the chroma signal of the video frame. In one embodiment, the pre-process module 104 may partition the video frame into multiple subpictures and processes the luma and chroma components of the pixels of the video frames in units of subpictures. Each subpicture of the received video frame represents a portion of the video frame and has a configurable height in terms of number of components of the pixels.

The pre-process module 104 reorders 830 the luma components on a scan line of the video frame onto two data channels of an encoder. Each data channel of the encoder accepts half of the luma components of the original scan line; one of the data channels containing a second half of the luma components on the scan line is conventionally used for inputting chroma components, e.g., the corresponding Cb components, to an encoder.

The pre-process module 104 also reorders 840 the corresponding chroma components. In one embodiment, the pre-process module 104 remaps the chroma components onto a third data channel of the encoder while maintaining the original spatial relationship of the chroma components on the related scan lines by grouping same type of chroma components, e.g., Cb or Cr components, into their respective subpictures. The pre-process module 104 generates 850 a data structure to record the reordering information for luma components and chroma components. The data structure can be frame based or subpicture based. An encoder of the source device, e.g., the encoder 106 of the source device 100 in FIG. 2, encodes 860 the frame according to the generated data structure and transmits the encoded frame to a sink device, e.g., the sink device 105 in FIG. 2.

Figure 5:
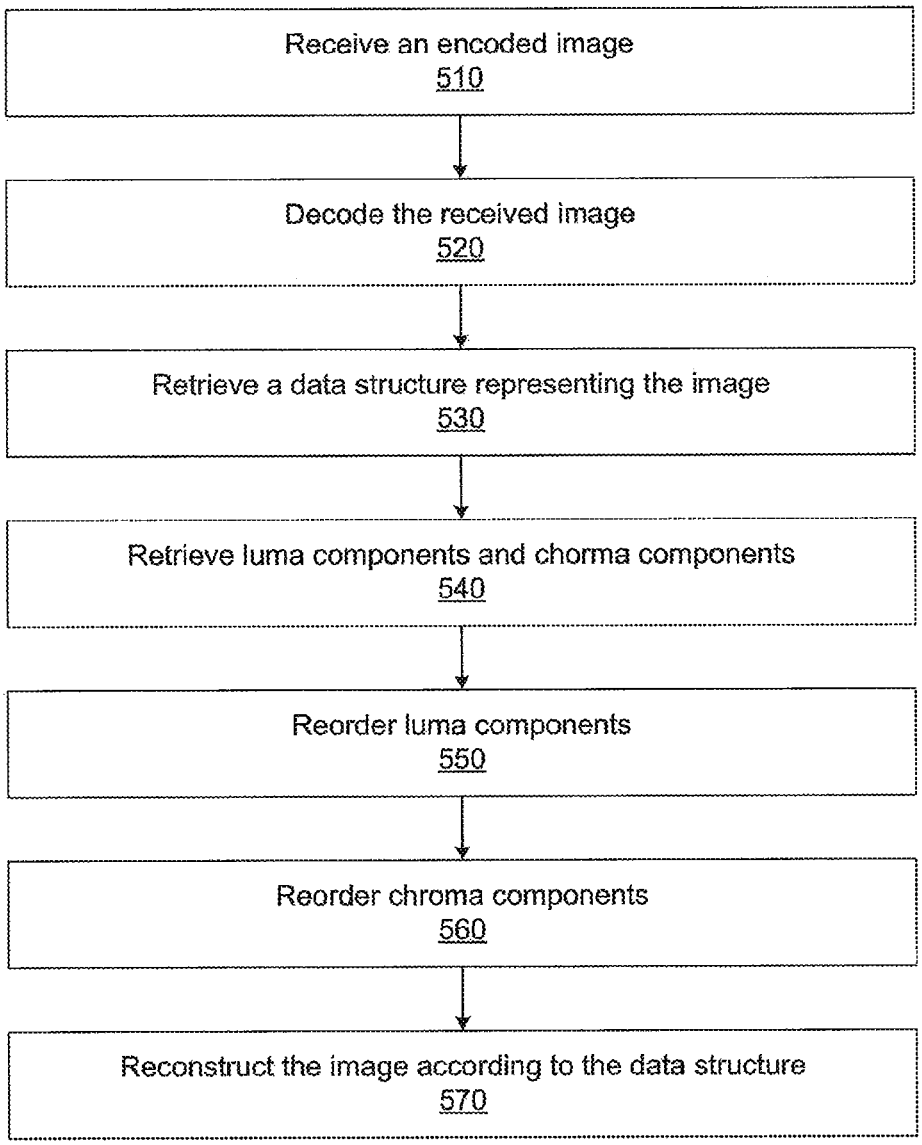
FIG. 5 is a flow chart illustrating a process for post-processing luma and chroma components of pixels of a video frame at a sink device according to one embodiment.

FIG. 5 is a flow chart illustrating a process for post-processing luma and chroma components of pixels of a video frame at a sink device according to one embodiment. Initially, a decoder of the sink device, e.g., the decoder 110 of the sink device 105 in FIG. 2, receives 510 an encoded image from a source device and decodes 520 the received image. The components of the decoded image are transmitted to a post-process module, e.g., the post-process module 112 in FIG. 2, over three data channels. The post-process module 112 retrieves 530 a data structure that describes the mapping of luma components and chroma components and retrieves 540 the luma components and chroma components from the decoder.

The post-process module 112 reorders 550 the luma components onto two data channels of the decoder to luma components on a Y channel of a scan line according to the retrieved data structure. The post-process module 112 reorders 560 the corresponding chroma components on the data channels to two chroma lines, one for Cb components and one for Cr components. The post-process module 112 reconstructs 570 the image after the reordering, where the reconstructed image is in a proper 4:2:0 format for display.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. One of ordinary skill in the art will understand that the hardware, implementing the described modules, includes at least one processor and a memory, the memory comprising instructions to execute the described functionality of the modules.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting.

What is claimed is:

[1. A method for encoding a digital image, the method comprising:

receiving the digital image of a plurality of pixels, each pixel having a luma component and two corresponding chroma components;

extracting luma components and chroma components from the plurality of pixels;

reordering the luma components and reordering the chroma components extracted from the plurality of pixels, wherein reordering the luma components and reordering the chroma components comprises:

for a plurality of pixels received on each scan line of the digital image:

providing a first half of the luma components on a first data channel of three data channels, the three data channels configured for transmitting the luma components and chroma components of the plurality of pixels of the scan line;

providing a second half of the luma components on a second data channel of the three data channels; and providing the two corresponding chroma components on a remaining data channel of the three data channels; and generating a data structure representing the digital image based on the reordering of the luma components and the reordering of the chroma components.]

[2. The method of claim 1, further comprising encoding the digital image according to the data structure.]

[3. The method of claim 1, wherein each of the plurality of pixels is in a sampling format, where two chroma components of the pixel are sampled at half the sample rate of luma component of the pixel in horizontal and vertical directions.]

[4. The method of claim 1, wherein the plurality of pixels of the digital image are received in an order according to a scan line of the plurality of pixels, each scan lining having a predetermined horizontal resolution.]

[5. The method of claim 1, wherein the reordering the luma components comprises:

for the plurality of pixels received on each scan line of the digital image:

separating the luma components of the pixels on the scan line into two parts, wherein each part has a half of the luma components of the plurality of pixels on the scan line.]

[6. The method of claim 1, wherein the digital image is partitioned into a plurality of subpictures, each subpicture having a partial horizontal resolution of a corresponding horizontal resolution of the digital image, and each subpicture having a partial vertical resolution of a corresponding vertical resolution of the digital image.]

[7. The method of claim 1, further comprising maintaining a spatial relationship of each pixel component within a subpicture after reordering such that the spatial relationship of individual pixel components within the subpicture is the same as the spatial relationship of the corresponding individual components within the subpicture.]

[8. A method for decoding an encoded digital image, the method comprising:

receiving the encoded digital image of a plurality of pixels, each pixel having a luma component and two corresponding chroma components;

extracting luma components and chroma components from the plurality of pixels;

reordering the luma components and reordering the chroma components extracted from the plurality of pixels according to a data structure describing the reordering, wherein reordering the luma components and reordering the chroma components comprises:

providing the luma components of the plurality of pixels on two data channels of three data channels, the three data channels configured for transmitting the luma components and chroma components of the plurality of pixels of the scan line, wherein each data channel of the two data channels has a half of the luma components of the plurality of pixels on a scan line; and providing the two corresponding chroma components on a remaining data channel of the three data channels; and reconstructing a digital image with reduced color resolution based on the reordering of the luma components and the chroma components of the digital image.]

[9. The method of claim 8, wherein the reordering the luma components comprises:

reordering the selected luma components on the scan line according to the data structure describing the reordering.]

[10. A non-transitory computer readable medium storing executable computer program instructions for encoding a digital image, the computer program instructions comprising instructions that when executed cause a computer processor to:

receive the digital image of a plurality of pixels, each pixel having a luma component and two corresponding chroma components;

extract luma components and chroma components from the plurality of pixels;

reorder the luma components and reorder the chroma components extracted from the plurality of pixels, wherein the computer program instructions that when executed cause the computer processor to reorder the luma components and the chroma components further comprise instructions to:

for a plurality of pixels received on each scan line:

provide a first part of the luma components on a first data channel of three data channels, the three data channels configured for transmitting the luma components and chroma components of the plurality of pixels of the scan line;

provide a second part of the luma components on a second data channel of the three data channels; and provide the two corresponding chroma components on a remaining data channel of the three data channels; and generate a data structure representing the digital image based on the reordering of the luma components and the reordering of the chroma components.]

[11. The computer readable medium of claim 10, further comprising computer program instructions that when executed cause the computer processor to encode the digital image according to the data structure.]

[12. The computer readable medium of claim 10, wherein each of the plurality of pixels is in a sampling format, where two chroma components of the pixel are sampled at half the sample rate of luma component of the pixel in horizontal and vertical directions.]

[13. The computer readable medium of claim 10, wherein the plurality of pixels of the digital image are received in an order according to a scan line of the plurality of pixels, each scan lining having a predetermined horizontal resolution.]

[14. The computer readable medium of claim 10, wherein the computer program instructions for reordering the luma components comprise instructions that when executed cause the computer processor to:

for the plurality of pixels received on each scan line:

separate the luma components of the pixels on the scan line into the two parts, wherein each part has a half of the luma components of the plurality of pixels on the scan line.]

[15. The computer readable medium of claim of claim 10, wherein the digital image is partitioned into a plurality of subpictures, each subpicture having a partial horizontal resolution of a corresponding horizontal resolution of the digital image, and each subpicture having a partial vertical resolution of a corresponding vertical resolution of the digital image.]

[16. The computer readable medium of claim 10, further comprising computer program instructions to maintain a spatial relationship of each pixel component within a subpicture after reordering such that the spatial relationship of individual pixel components within the subpicture is the same as the spatial relationship of the corresponding individual components within the subpicture.]

[17. A non-transitory computer readable medium storing executable computer program instructions for decoding an encoded digital image, the computer program instructions comprising instructions that when executed cause a computer processor to:

receive the encoded digital image of a plurality of pixels, each pixel having a luma component and two corresponding chroma components;

extract luma components and chroma components from the plurality of pixels;

reorder the luma components and reorder the chroma components extracted from the plurality of pixels according to a data structure describing the reordering, wherein the computer program instructions for reordering the luma components and reordering the chroma components comprise instructions that when executed cause the computer processor to:

provide the luma components of the pixels on two data channels of three data channels, the three data channels configured for transmitting the luma components and chroma components of the plurality of pixels of the scan line, wherein each data channel of the two data channels has a half of the luma components of the plurality of pixels on a scan line; and provide the two corresponding chroma components on a remaining data channel of the three data channels; and reconstruct a digital image with reduced color resolution based on the reordering of the luma components and the chroma components of the digital image.]

[18. The computer readable medium of claim 17, wherein the computer program instructions for reordering the luma components comprise instructions that when executed cause the computer processor to:

reorder the selected luma components on the scan line according to the data structure describing the reordering.]

*19. A source device for encoding a digital image, the device comprising:*

*a pre-process module configured to:*

*receive data defining a plurality of pixels of the digital image, wherein each of the plurality of pixels is defined by a luma pixel component and two corresponding chroma pixel components;*

*separate the luma pixel components and the two corresponding chroma pixel components of the plurality of pixels;*

*reorder the plurality of pixels from a received order by:*

*mapping a first portion of the luma pixel components onto a first data channel of three data channels;*

*mapping a second portion of the luma pixel components onto a second data channel of the three data channels; and*

*mapping the two corresponding chroma pixel components onto a remaining data channel of the three data channels;*

*an encoder configured to:*

*encode the luma pixel components and the two corresponding chroma pixel components on the three data channels to obtain encoded data; and*

*transmit the encoded data on a transmission channel.*

*20. The source device of claim 19, wherein the reordering of the plurality of pixels maintains an original relative spatial relationship of the plurality of pixels.*

*21. The source device of claim 19, wherein the data is associated with a 4:2:2 sampling ratio or a 4:2:0 sampling ratio.*

*22. The source device of claim 19, wherein the pre-process module is further configured to partition the plurality of pixels into a plurality of subpictures, and wherein each of the plurality of subpictures comprises a subset of the plurality of pixels.*

*23. The source device of claim 22, wherein each of the plurality of subpictures has a partial horizontal resolution of a corresponding horizontal resolution of the digital image and a partial vertical resolution of a corresponding vertical resolution of the digital image.*

*24. The source device of claim 22, wherein a first set of the luma pixel components of each of the plurality of subpictures is mapped onto the first data channel, and wherein a second set of the luma pixel components of each of the plurality of subpictures is mapped onto the second data channel.*

*25. The source device of claim 22, wherein each of the plurality of subpictures contains a set of pixels associated with respective portions of a plurality of scan lines of the digital image.*

*26. The source device of claim 22, wherein the pre-process module is configured to partition the plurality of pixels by splitting each scan line of the digital image such that the luma pixel components of each scan line is split into a respective first stream and a respective second stream, wherein the luma pixel components of each first stream are mapped onto the first data channel, and wherein the luma pixel components of each second stream are mapped onto the second data channel.*

*27. The source device of claim 26, wherein, for each scan line, an original relative spatial relationship of the luma pixel components of the first stream is maintained and an original relative spatial relationship of the luma pixel components of the second stream is maintained.*

*28. The source device of claim 22, wherein each of the plurality of subpictures comprises a portion of the luma pixel components and a portion of only one chroma pixel component of the two corresponding chroma pixel components.*

*29. The source device of claim 22, wherein the pre-process module is configured to partition the plurality of pixels based on a setting indicative of a number of subpictures and/or a size of each subpicture.*

*30. The source device of claim 19, wherein the plurality of pixels of the digital image are received in an order according to a scan line of the plurality of pixels, wherein each scan line has a predetermined horizontal resolution.*

*31. The source device of claim 19, wherein the encoder is configured to transmit information indicative of the reordering to facilitate decoding of the encoded data, wherein the transmission channel is a serial transmission channel.*

*32. The source device of claim 31, wherein the encoder is configured to encode the luma pixel components and the two corresponding chroma pixel components based on the information, and wherein the serial transmission channel is a high definition multimedia interface (HDMI) channel or a mobile high-definition link (MHL) channel.*

*33. A sink device for decoding the encoded data from the source device of claim 19, the sink device comprising:*

*a decoder configured to:*

*receive the encoded data from the encoder; and*

*decode the encoded data to obtain decoded data;*

*a post-process module configured to:*

*extract the luma pixel components associated with the first and second data channels;*

*extract the two corresponding chroma pixel components associated with the remaining data channel; and*

*reconstruct a digital image with reduced color resolution based on the luma pixel components and the two corresponding chroma pixel components.*

*34. The sink device of claim 33, wherein the post-process module is further configured to:*

*receive information indicative of the reordering of the plurality of pixels; and*

*reordering the luma pixel components and the two corresponding chroma pixel components according to the information, wherein the reconstructing of the digital image is based on the reordering of the luma pixel components and the two corresponding chroma pixel components.*

*35. A sink device for decoding an encoded digital image, the sink device comprising:*

*a decoder configured to:*

*receive the encoded digital image comprising a plurality of pixels, wherein each of the plurality of pixels is defined by a luma pixel component and two corresponding chroma pixel components;*

*decode the encoded digital image to obtain decoded data;*

*provide the luma pixel components onto two data channels of three data channels;*

*provide the two corresponding chroma pixel components onto a remaining data channel of the three channels; and*

*a post-process module configured to:*

*reorder the luma pixel components and the two corresponding chroma pixel components; and*

*reconstruct a digital image with reduced color resolution based on the reordering.*

*36. The sink device of claim 35, wherein the post-process module is configured to reorder by:*

*reordering the luma pixel components on the two data channels to a luma channel; and*

*reordering the two corresponding chroma pixel components on the remaining channel to two chroma lines.*

*37. The sink device of claim 35, wherein each of the two data channels has a respective portion of the luma pixel components, and wherein the reduced color resolution is associated with a 4:2:0 sampling ratio or a 4:2:2 sampling ratio.*

*38. The sink device of claim 35, wherein the reordering is based on a data structure comprising information indicative of a reordering performed at a source device, and wherein the encoded digital image and the data structure are received via a high definition multimedia interface (HDMI) channel or a mobile high-definition link (MHL) channel.*

* * * * *